US008194697B2

(12) United States Patent
Guillot et al.

(10) Patent No.: US 8,194,697 B2
(45) Date of Patent: Jun. 5, 2012

(54) SELECTIVE CONNECTION DEVICE ALLOWING CONNECTION OF AT LEAST ONE PERIPHERAL TO A TARGET COMPUTER AND A SELECTIVE CONTROL SYSTEM COMPRISING SUCH A DEVICE

(75) Inventors: François Guillot, Paris (FR); Jean-Marie Courteille, Paris (FR)

(73) Assignee: Sagem Defense Securite, Paris (FR)

( * ) Notice: Subject to any disclaimer, the term of this patent is extended or adjusted under 35 U.S.C. 154(b) by 44 days.

(21) Appl. No.: 12/036,412

(22) Filed: Feb. 25, 2008

(65) Prior Publication Data

US 2008/0263232 A1    Oct. 23, 2008

(30) Foreign Application Priority Data

Feb. 26, 2007    (FR) ...................................... 07 01363

(51) Int. Cl.
*H04L 12/66* (2006.01)
(52) U.S. Cl. ........ 370/463; 370/276; 370/351; 370/352; 370/419; 370/422; 370/423; 710/12; 710/51; 710/36; 710/38
(58) Field of Classification Search .................. None
See application file for complete search history.

(56) References Cited

U.S. PATENT DOCUMENTS

| | | | | |
|---|---|---|---|---|
| 4,673,933 A * | 6/1987 | Bauer | ............................... | 341/22 |
| 5,101,151 A * | 3/1992 | Beaufils et al. | ................ | 324/763 |
| 5,574,943 A * | 11/1996 | Daftari | .............................. | 710/1 |
| 5,619,722 A * | 4/1997 | Lovrenich | .......................... | 710/2 |
| 6,108,787 A | 8/2000 | Anderson et al. | | |
| 6,611,518 B1 * | 8/2003 | Ngo et al. | ...................... | 370/386 |
| 6,718,385 B1 * | 4/2004 | Baker et al. | .................... | 709/225 |
| 7,042,893 B1 * | 5/2006 | Lo et al. | .......................... | 370/419 |
| 7,136,946 B2 * | 11/2006 | Shirley | ............................ | 710/62 |
| 7,406,518 B2 * | 7/2008 | Lasserre | ........................ | 709/225 |
| 7,428,600 B2 * | 9/2008 | Saito et al. | ......................... | 710/8 |
| 2001/0054159 A1 * | 12/2001 | Hoshino | ........................ | 713/201 |
| 2002/0112181 A1 | 8/2002 | Smith | | |
| 2005/0105548 A1 | 5/2005 | Courteille et al. | | |
| 2005/0122897 A1 * | 6/2005 | Gonda | ........................... | 370/216 |
| 2006/0191004 A1 | 8/2006 | Alcouffe | | |
| 2007/0150685 A1 * | 6/2007 | Shevchenko | .................. | 711/167 |
| 2007/0171937 A1 * | 7/2007 | Boatright et al. | ............. | 370/465 |

FOREIGN PATENT DOCUMENTS

| | | |
|---|---|---|
| EP | 1533947 A1 | 5/2005 |
| EP | 1686758 A1 | 8/2006 |
| WO | WO 2005/085971 | 9/2005 |

OTHER PUBLICATIONS

Menoher J., "Owl Product Overview: Secure One-Way Data Transfer Systems", Olw Product Family Overview, Jun. 29, 2006, pp. 1-19.

(Continued)

*Primary Examiner* — Ayaz Sheikh
*Assistant Examiner* — Peter Chau
(74) *Attorney, Agent, or Firm* — Gerald E. Helget; Briggs and Morgan, P.A.

(57) ABSTRACT

A selective connection device allowing the connection of at least one peripheral to a target computer and a selective control system comprising such a device. It relates to the field of devices for the selective connection of a control device composed of input/output peripherals to various target computers. The selective connection device affords security guarantees by preventing communication between the various target computers that may be controlled.

11 Claims, 4 Drawing Sheets

OTHER PUBLICATIONS

Lagadec P., Diode reseau et ExeFilter: 2 projets pour des interconnexions secruisees, Actes Du Sumposium SSTICO6, Jul. 5, 2006, pp. 1-15.

Lagadec P., "Diode Roseau and ExeFilter: Two Projects for Secure Connections Between Networks", Jul. 5, 2006, pp. 1-15.

* cited by examiner

SELECTIVE CONNECTION DEVICE ALLOWING CONNECTION OF AT LEAST ONE PERIPHERAL TO A TARGET COMPUTER AND A SELECTIVE CONTROL SYSTEM COMPRISING SUCH A DEVICE

CROSS-REFERENCE TO RELATED APPLICATIONS

The present application is based on and claims priority of International Patent Application Serial No. FR 07/01363 filed on Feb. 26, 2007, the content of which is hereby incorporated by reference in its entirety.

BACKGROUND OF THE INVENTION

The present invention concerns a selective connection device for connecting at least one peripheral to a target computer and a selective control system comprising such a device. It is aimed in particular at the field of selective connection devices for a control device composed of input/output peripherals with different target computers. More particularly, the invention concerns such a device affording guarantees of security by preventing communication between the various target computers that may be controlled.

Hereinafter, any electronic information processing device will be called by the generic term computer. Devices allowing the selective control of several target computers, from the same set of input/output peripherals, already exist. Such devices allow the selective connection of a computer screen and keyboard to several computers. These devices generally allow the connection of several video cables, generally according to the VGA (Video Graphic Array in English) standard, and several keyboard and/or mouse cables, generally according to the PS/2 (Personal System/2 in English) or USB (Universal Serial Bus in English) standard, which are directly connected to the central units and to the device. On the other hand, one cable is connected to a screen and two others to the keyboard and mouse. A selector makes it possible to physically connect the video cable connected to the screen to one of the cables connected to one of the central units, while the keyboard and mouse cables are connected, via the same selector, to the same central unit. By an action on the selector, the user can thus change the central unit to which the screen, keyboard and mouse that he is using are connected. Such devices are well known and relatively simple to design. On the other hand, connection is possible only over relatively short distances. In particular, the video link is limited to a few meters. This solution therefore cannot be envisaged whenever it is wished to be able to control central units distant by more than a few meters.

Software solutions exist that allow the distant control of computers over a telecommunication network. It is possible to cite by way of example the RDP (Remote Desktop Protocol in English) connection protocol that makes it possible to take control of a distant machine by conveying, via an IP network, the commands coming from the local control keyboard to the computer that is to be controlled, on the one hand, and on the other hand graphical commands from the controlled computer to the control computer. In this way, the distant computer is controlled over the network from the peripherals of the local computer in the same way as if the screen, keyboard and mouse of the local computer were directly connected to the distant computer. It is possible by this means to connect successively to different machines and therefore to effect a selective control of a plurality of distant computers from the same control device. The control device is composed here of the screen, the keyboard and the mouse of the local computer.

This solution differs from the previous one by the fact that a local central unit is necessary in order to manage the command exchange protocol between the control device and the controlled computer. This central unit makes it possible to organise firstly the encapsulation of the keyboard and mouse commands in data packets sent via the network to the distant computer, and secondly the reception and interpretation of the graphical commands for the local reproduction of the control screen of the distant computer. The distant computer must be provided with dual means for receiving and interpreting the commands issuing from the keyboard and mouse, on the one hand, and the sending of graphical commands on the other hand. Various solutions based on these principles are at the present time offered for all available operating systems: the client server protocol X11 within X-windows on UNIX works stations can be cited.

These software solutions function very correctly provided that the local computer dedicated to the control and the distant computers that it is wished to control are connected to the same communication network. Whenever the distant computers belong to distinct networks, the problem becomes complicated. This is because, in order to make the software solutions as described function, it is first necessary to connect the control computer to the communication network affording connection to the distant computer that it is wished to control, which may be called the target computer. The operation consisting of changing target computer consequently becomes relatively complex as it involves disconnection of the current control session, connection to a new physical communication network, change of network parameters in order to take account of the new network and finally initialisation of a new control connection with the new target computer. There is therefore there a first problem related to the complexity of the operation of changing target computer.

Moreover, one of the reasons why it may be necessary to wish to control target computers belonging to different networks relates to questions of security. In this case, it is possible that these different target computers may belong to networks that have been intentionally separated since they do not all have the same security constraints. In this case, it is generally desired to prevent the communication of potentially sensitive information between these different networks, the propagation of malicious codes, taking control, etc. In this context of the wish for security and impermeability of the various networks to any transfer of data, a local network serving to control target computers in alternation on these different networks represents a weakness of the security system. This is because it is difficult to guarantee that information cannot be stored on this control computer during a session on a first network so as to reach a second network during a subsequent control session.

SUMMARY OF THE INVENTION

The invention aims to resolve the above problems by means of a selective connection device for different target processing means. This device makes it possible to connect at least one computer peripheral selectively to a target computer among a plurality of target computers. The connections between the peripheral and the target computer are connections made physically unidirectional. In the case where information input peripherals and information output peripherals are to be connected to the target computer, two unidirectional selection devices in opposite directions are used. In addition, in this case, the local control means for the information output peripherals and information input peripherals are physically separate and not connected together.

The invention thus offers the advantage of allowing alternately the distant control of a plurality of target computers, this without any concern about distance between the control device and target computers and physically guaranteeing the impossibility for the information to be able to pass between the various target computers via the control device.

The invention concerns a selective connection device allowing the connection of at least one peripheral to a target computer among a plurality of target computers, comprising a control means for the peripheral or peripherals, this control means being connected to the peripheral, a selector, a first data communication link between the control means and the selector, a plurality of data communication links between the plurality of target computers and the selector, each link in the plurality of links being connected to a target computer in the plurality of target computers, the selector allowing the connection of the first link to any one of the links in the plurality of links in order to allow communication between the control means and any one of the target computers, and where the said selective connection device includes a means of making the communication between the control means and the target computer physically unidirectional.

According to a particular embodiment of the invention, the communication links being Ethernet links, the means for making the communication between the control means and the target computer physically unidirectional is a diode device inserted on at least one of the links, consisting of a first Ethernet interface comprising a reception port and a transmission port, a second Ethernet interface comprising a reception port and a transmission port, the said reception port of the first interface being connected to the transmission port of the second interface, the reception port of the second interface being kept disconnected from the transmission port of the first interface and an integrity signal being sent over the transmission port of the first interface.

According to a particular embodiment of the invention, the diode device integrating the selector integrates a plurality of first interfaces, the reception port of each of these first interfaces being connected to the transmission port of the second interface via a means for interrupting the signal controlled electrically, so that only one of these reception ports of the first interfaces is actively connected to the transmission port of the second interface.

According to a particular embodiment of the invention, the diode device integrating the selector integrates a plurality of first interfaces, the transmission port of each of these first interfaces being connected to the reception port of the second interface via means for interrupting the signal controlled electrically, so that only one of these transmission ports of the first interfaces is actively connected to the reception port of the second interface.

According to a particular embodiment of the invention, the communication links being Ethernet links, the means for making the communication between the control means and the target computer physically unidirectional is integrated within an Ethernet interface of the said device, the said interface comprising a module for physical management of the Ethernet link, a module for MAC management of the Ethernet link connected by a bus to the physical management module of the Ethernet link, the said bus consisting of unidirectional links, and only the unidirectional links used by the communication in the desired direction being connected.

According to a particular embodiment of the invention, the interface hosting the means for making the communication between the control means and the target computer physically unidirectional contains a plurality of Ethernet interfaces, a plurality of physical management modules for the said interfaces and a plurality of means for interrupting the signal controlled electrically so that only one of the physical modules of the plurality of physical modules is actively connected to the MAC management module.

According to a particular embodiment of the invention, the device comprises two devices as described previously and is characterised in that the communication directions between the two devices are opposite to each other and in that the selectors are coupled.

According to a particular embodiment of the invention, the said device is characterised in that the two links of the two pluralities of links between a given target computer and each selector consist of a single network link connected to a single network interface of the said target computer connected in one direction to a first one of the said devices as described previously and connected in the other direction to the second of the said devices as described previously.

According to a particular embodiment of the invention, the device also comprises a third selector at the link between one of the controllers and at least one peripheral connected to the said controller allowing direct connection of at least one target computer to the said peripheral.

The invention also concerns a system for the selective control of a target computer among a plurality of target computers by means of a control member comprising at least one computer peripheral, at least one computer peripheral being connected to the plurality of target computers by means of a selective connection device as described previously.

BRIEF DESCRIPTION OF THE DRAWINGS

The characteristics of the invention mentioned above, as well as others, will emerge more clearly from a reading of the following description of an example embodiment, the said description being given in relation to the accompanying drawings, among which.

DETAILED DESCRIPTION OF THE INVENTION

Figure 1:
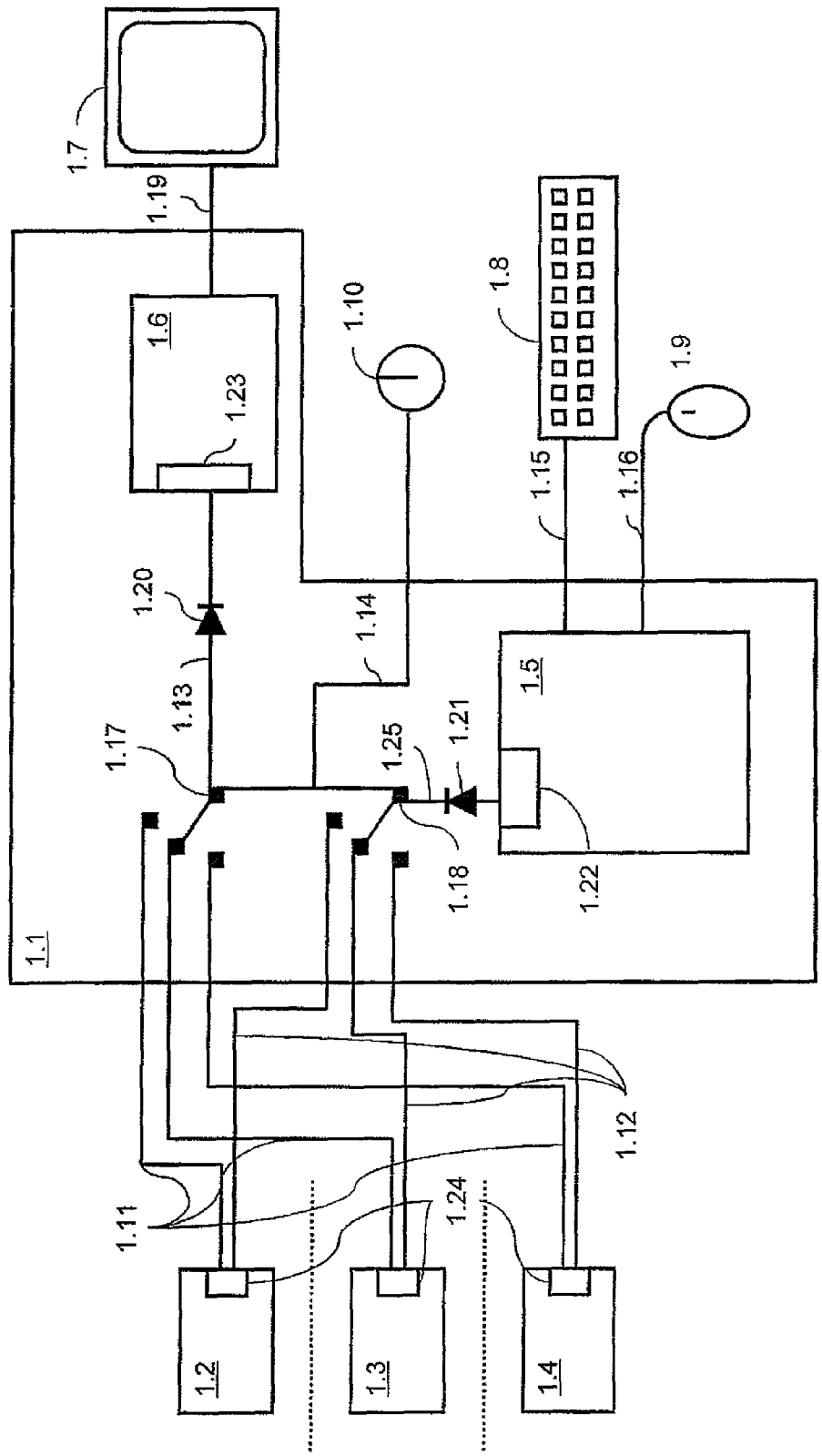
FIG. 1 presents the general architecture of an embodiment of the invention.

FIG. 1 illustrates the architecture of an embodiment of the invention. The selective connection device can be seen therein, referenced 1.1, which makes it possible to take control of the computers 1.2, 1.3 and 1.4 in alternation. This connection device 1.1 is connected locally to peripherals allowing control of the distant computers 1.2, 1.3 and 1.4. These peripherals comprise one or more information output peripherals. FIG. 1 depicts a single information output peripheral, in this case a screen referenced 1.7. A person skilled in the art will understand that it is possible to connect any information output peripheral in the same way by connecting it for example to the controller 1.6. These other output peripherals then comprise sound reproduction means or a printer for example. This screen is controlled locally by a controller 1.6, which may for example be a personal computer provided with a graphics card. In this case, the connection between the controller 1.6 and the screen 1.7 is a conventional video connection able to meet the VGA or DVI (Digital Video Interface in English) standard. Information input peripherals are also connected to the device 1.1. FIG. 1 depicts a keyboard 1.8 and a computer mouse 1.9 connected respectively via the link 1.15 and the link 1.16. These links can meet the USB (Universal Serial Bus in English) standard or any other communication standard adapted to communication between such peripherals and a central unit such as for example PS/2 (Personal System/2 in English). Any other information input peripheral can be connected in the same way to the device 1.1, these peripherals being able to comprise a trackball, a graphics pad, or any other information input peripheral that can be connected to a computer. These information input peripherals are connected to an input peripherals controller referenced 1.5. A control device referenced 1.10 makes it possible to control, via a link 1.14, the two selectors 1.17 and 1.18. The first selector 1.17 makes it possible to selectively connect one of the target computers 1.2, 1.3 or 1.4 to the information output peripheral controller 1.6. In a similar fashion, the selector 1.18 makes it possible to selectively connect one of the target computers 1.2, 1.3 or 1.4 to the input peripheral controller 1.5. In the preferred embodiment of the invention the two selectors 1.17 and 1.18 function coupled to each other under the synchronised control of a single control device 1.10 so as to guarantee that at any time, the same target computer is connected firstly to the information output peripherals controller 1.6 and secondly to the information input peripheral controller 1.5. The various target computers 1.2, 1.3 and 1.4 are connected via links 1.11 to the output selector, that is to say to the selector connected to the information output peripherals controller, while they are connected via links 1.12 to the input selector, that is to say to the selector connected to the information input peripherals controller 1.5.

The links between the target computers and the selectors, and then between the selectors and the controllers, referenced 1.13 and 1.25, are preferentially links allowing the establishment of data communication. In a preferred embodiment of the invention, these links are Ethernet links standardised by the 802.3 and 802.x standards of the IEEE (Institute of Electrical and Electronics Engineers). The Ethernet connection allows the communication of data between the controllers 1.5 and 1.6 and the target computer selected by the selectors 1.17 and 1.18. The controllers 1.5 and 1.6 and the target computers 1.2, 1.3 and 1.4 have specific software modules 1.22, 1.23 and 1.24 managing the data communication between the controllers and the target computer. Although described on the basis of Ethernet links, the invention can also use any type of link between the target computers and the controllers such as for example serial links or others. The preferred embodiment is based on 100BASE-Tx Ethernet links for the communications. The communications are managed in the following manner. The sending module 1.22 for the data from the information input peripherals encapsulates the said data and sends over the Ethernet link to the selected target computer the said encapsulated data issuing from the input peripherals. These data are collected by the controller 1.5. A corresponding reception module, within the module 1.24, receives these data, decodes them and supplies them to the application layer of the selected target computer. This module functions as a controller for the distant peripherals. In this way, having regard to the applicative layer of the target computer selected, everything happens as if the input peripherals such as the keyboard or mouse were directly connected to the target computer. On startup the controller 1.5 initialises the input peripherals and then transmits the actions of the user to the module 1.24 of the target computer. To do this, the controller 1.5 contains a peripheral controller and a reduced operating system such as for example a real-time system based on a simple scheduler. The communication protocol can be based on the IP protocol (Internet Protocol) at the transport level and on the UDP protocol (User Datagram Protocol) for the control layer. These protocols are well known to persons skilled in the art and simple to implement. To manage the problems of change of addressing space when switching the sending of data between two target computers, a multicast mode is implemented. Multicast mode makes it possible to define a multicast address independent of the IP addresses of the destination computers. The data packets sent with this multicast broadcast address as a destination address will be received by all the computers previously subscribed to said multicast broadcast address. The details of the functioning of multicast can be found in RFC (Request for Comment) 3171, the RFCs being a collection describing the protocols used on the internet maintained by the IETF (Internet Engineering Task Force). All the target computers able to be selected and controlled by the device will therefore subscribe to the said broadcast address so as to receive the data sent by the controller 1.5.

In a similar manner, the data intended for the output peripherals will be sent via the link 1.11 to the controller 1.6. These data are also encapsulated in packets using the IP and UDP protocols by the module 1.24 intended for the module 1.23 of the controller 1.6. Here the destination is known and always the same. It is therefore possible to use either a multicast mode as previously, or a unicast mode. It is possible also to use for the video existing protocol making it possible to transfer the graphics generated by a computer onto a distant computer. Numerous protocols exist according to the software environment chosen. For example, in the UNIX world, the X11 protocol of the X-Windows system makes it possible to send graphics commands making it possible to display on a local computer the video from a distant computer. The RDP protocol also makes it possible, in the form of a TSE (Terminal Server Edition) sending graphics commands to a client, to transfer graphics to a distant screen. The preferred embodiment is based on the RDP protocol allowing the sending, by a TSE server in the module 1.24, of graphics commands to a client in the module 1.23 of the controller 1.6. In this way, the screen 1.17 makes it possible to display the graphics coming from the selected target computer. According to a variant implementation, the module 1.24 contains an MPEG (Moving Picture Experts Group) compression module that generates a compressed video stream intended for the controller 1.6. The latter contains an MPEG decoder and generates the video received on the screen 1.17. This variant may be further adapted according to the graphics transmitted, for example in the case of video. On the other hand, in the case where the graphics consist of images of a conventional computing man-machine interface, a vectoriel command protocol, such as the RDP protocol, will be less greedy in terms of bandwidth.

It is assumed that the target computers that it is wished to control may belong to different networks. These different networks may obey different security requirements. Because of this, it is desirable to guarantee that, in a highly secure context, it is not possible to use the selective connection device for transmitting information between the different target computers. For this purpose, the links connecting the target computer and the controllers will be made physically unidirectional. The two controllers 1.5 and 1.6 not being connected together, the unidirectional character of the links makes impossible any transfer of information between two target computers. This is because, the link between the input peripheral controller and the target computer allowing information to pass only in the direction from the controller to the computer, no information can go back to the controller. On the other hand, information transmitted via the unidirectional link between the target computer and the output peripheral controller 1.6 may possibly be stored at the said controller 1.6, but have no physical means of being transmitted from this controller to another target computer. This is because they cannot physically go back over the link to the target computers and, as no connection exists to the controller of the input peripherals 1.5, also cannot go back via this link to another target computer.

Figure 2:
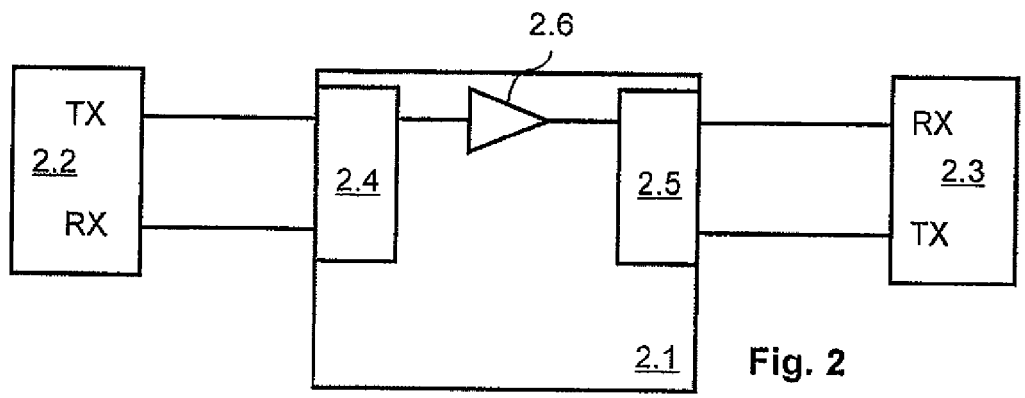
FIG. 2 presents the architecture of an embodiment of an Ethernet diode.

The Ethernet links are made physically unidirectional, for example by the use of what can be called an Ethernet diode. Several implementations of this Ethernet diode are possible. FIG. 2 describes schematically the functioning of such a diode according to a first embodiment. An Ethernet link is composed of at least two pairs of conductors allowing the transmission of information. Each pair is dedicated to one communication direction. The link is connected to an Ethernet interface comprising two ports: a first transmission port TX and a second reception port RX. FIG. 2 shows the functioning of a diode 2.1 on an Ethernet link between a first Ethernet interface 2.2, consisting of its two ports, a reception port RX and a transmission port TX. The link is also connected to a second Ethernet interface 2.3, where the ports are reversed with regard to reception and transmission. The diode provides the transfer of information from the first interface to the second while physically preventing any transfer of information in the opposite direction. The diode 2.1 itself comprises two Ethernet interfaces: a first interface 2.4 and a second 2.5. The first interface 2.4 generates the carrier expected by the interface 2.2 on its reception port in order to indicate that the link is active and that information can be sent over the transmission port TX of the interface 2.2. This carrier constitutes an integrity signal for the Ethernet connection. The fast analogue amplifier 2.6 ensures the passage of the signals in the direction of transmission from the reception port of the first interface 2.4 to the transmission port of the second interface 2.5 but prevents signals going back in the other direction. This is necessary in order to guard against any turnaround of the link, this turnaround capacity now generally being included in Ethernet interface management modules. Any signals sent by the second interface 2.3 are stopped by the interface 2.5 within the diode and cannot pass to the first interface 2.4. There is no connection between the reception port of the second interface 2.5 and the transmission port of the first interface 2.4. Other implementations of such a diode are possible, for example by inserting in the diode, instead of the analogue amplifier, a component copying the signals received from the first interface over the link intended for the second, but preventing reverse copying.

Such a diode is preferentially inserted on the Ethernet link between controllers 1.5 and 1.6 and the selectors but can also be inserted on each link between the target computers and the selectors at any point on these connections between the controllers and the target connectors. We shall see embodiments where the diode is integrated in the selector, or even the Ethernet interface of the controller.

The fact that the links between the two controllers, input and output, and the target computers are unidirectional imply certain constraints on the transmission of the information over these links. This is one of the reasons that make the UDP protocol preferred for information exchanges over these links. This is because this protocol does not require acknowledgements and is therefore functional on unidirectional links. Certain adjustments have all the same to be provided at the controllers, and at the module 1.24 on the target computers, to allow management of the connected peripherals in the absence of bi-directional communications with the target computer. For example, the exchange of information relating to the size and to the resolutions accepted by the screen cannot take place when it is initialised. It is therefore necessary to choose this definition and to parameterise the graphics mode of the target computers with this chosen definition in order to ensure functioning of the graphics link.

Likewise, certain input peripherals, for example the keyboard, can display changes of state. This display is normally controlled by the computer to which they are connected. By way of example, the state of the capital lock key or the number lock key. The link being unidirectional, the target computer can no longer control these keys and activate the switching on of any state indicators on the keyboard. To resolve this problem, it is agreed that the input peripherals controller, according to the displayed state of the keyboard, sends the state of the keys to the target computer. The latter, at the module 1.24, ensures consistency by simulating as required the pressing on the lock keys in order modify the state of the target computer. In this way, consistency is maintained between the state of the keyboard as displayed by the keyboard by virtue of its integral indicators and the state of the keyboard as known to the target computer.

The obligation to use protocols without acknowledgement for the transfer of information between the controllers and the target computers also imposes certain constraints in the management of transmission errors. It is no longer possible to rely on the acknowledgements to effect retransmissions of information poorly received or not received. To mitigate this problem, the transmission system can comprise, in certain embodiments, redundancy mechanisms such as the use of error correction codes according to the FEC (Forward Error Correction) technique or automatic retransmission of data.

In a particular embodiment of the invention, the selector of the link to the output peripherals and the Ethernet diode providing the unidirectional side of the link is integrated in one and the same embodiment. This variant is described in FIG. 3, which repeats the diagram of FIG. 2, except that now the diode allows connection of several interfaces 3.2 on the source side. Each of these interfaces is connected to the interface 3.4, which corresponds to the interface 2.4 in FIG. 2 and which allows activation of the Ethernet interface by sending a carrier over the reception port of the interface. The output ports of the interfaces 3.4 are connected to electrically controlled fast analogue amplifiers 3.7, before being connected to a simple fast analogue 3.6. In this way, the selector is implemented by the activation of one of the analogue amplifiers, acting as an electrically controlled switch, allowing passage of the signals issuing from the corresponding interface, while the other amplifiers are off. At a given moment, only the reception port of one of the input interfaces 3.4 is actively connected to the transmission port of the output interface 3.5. The activation of an electrical control signal 3.8 therefore allows the selection of the target computer connected to the corresponding interface. Such a selector coupled to a diode can be implemented for any number of interfaces. The application of the same principle with a reversed diagram also makes it possible to implement the input peripheral selector integrated in the diode.

Figure 4:
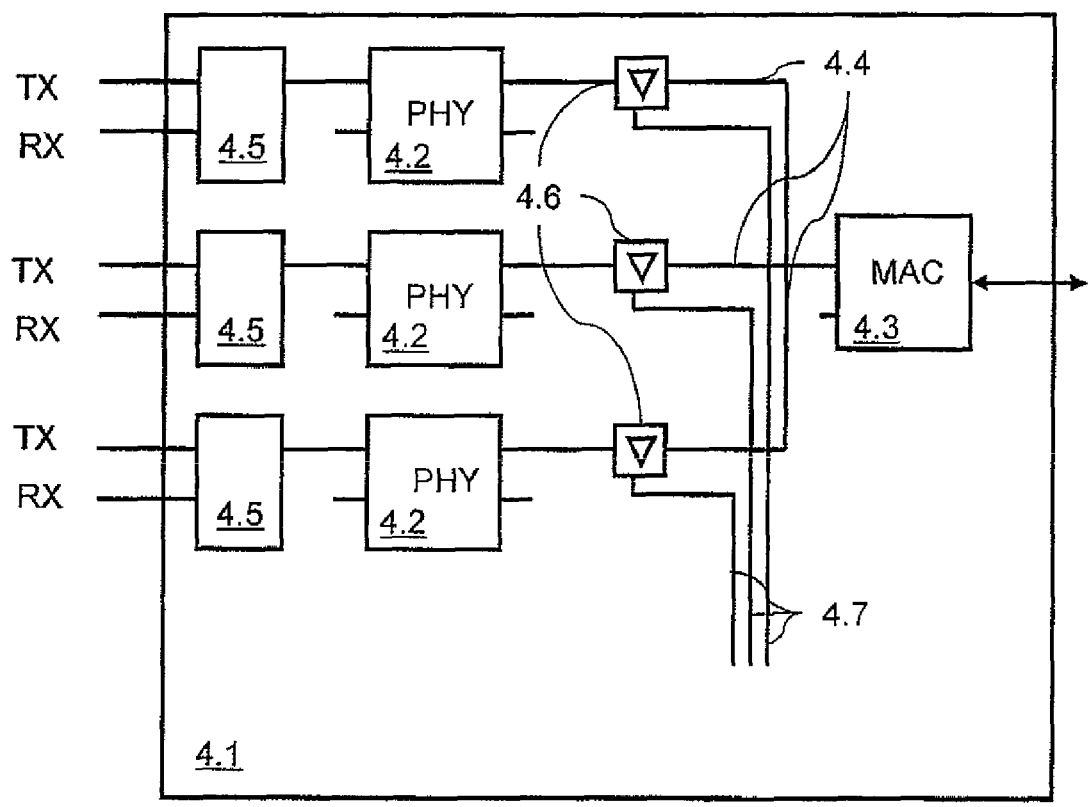
FIG. 4 presents the architecture of an embodiment of the output selector integrating an Ethernet diode, and FIG. 5 repeats part of FIG. 1 and illustrates a variant embodiment of the invention.

FIG. 4 illustrates another embodiment of a selector coupled with a diode. In this embodiment, the selector and the diode are implemented within an Ethernet interface possessing several pairs of reception ports and transmission ports. In this embodiment, the diode is based on the cutting of the links providing the transmission in one of the directions of a data bus between a management module for the physical layer of an Ethernet interface and the management module for the media, called an MAC (Media Access Control) management module. This is because the conventional architecture of an Ethernet interface is composed firstly of a physical management module 4.2 for the link. This module is responsible for the generation and analysis of the physical signals that pass over the link. The interface is composed firstly of an MAC management module generating the analysis and assembly of the packets according to the Ethernet protocol and the communication with the top layers. In reception mode, the signals that pass over the link are analysed and converted into numerical data by the physical layer. These numerical data are then transmitted to the MAC layer, which analyses them in the form of packets or Ethernet frames. These packets are then transmitted to the top layer, generally an IP stack. In transmission mode, the MAC layer receives the data to be transmitted from the top layers, typically the IP stack in the form of IP packets. It assembles the packets or Ethernets frames conveying the IP data and transmits them to the physical layer for their transmission in the form of signals over the link. The connection between the physical module PHY and the MAC module takes place by virtue of a bi-directional bus. This bus complies with the IEEE MII standard (Media Independent Interface). This bus is composed of unidirectional links and it is therefore possible to connect only the links corresponding to one direction. In FIG. 4 the link coming from the input peripherals controller 1.5 is connected to an input MAC module referenced 4.3. Only the links allowing the transmission of data from the MAC module 4.3 to the physical modules PHY are connected. The reception links of the MAC module are not connected. These links are divided into three branches and each branch is connected to a physical module PHY referenced 4.2 by means of a three-state buffer 4.6. The three-state buffers 4.6 function as switches and are controlled by electrical links 4.4 for ensuring that, at a given moment, only one path is open between the MAC module 4.3 and one of the PHY modules 4.2. Each PHY module 4.6 is connected to a transmission port TX of a corresponding Ethernet interface to allow the sending of the signals generated by the PHY module. This connection takes place by means of an Ethernet interface 4.5 corresponding to the interfaces 3.5 and 2.5, the function of which is to stop any signal coming from the reception port RX and arriving over the Ethernet interface. Such a device 4.1 makes it possible to integrate a selector and an Ethernet diode. According to this variant also, reversal of the diagram is possible in order to effect, according to the same principle, the integration of the output peripherals selector and the Ethernet diode. It should be noted that a simplified design comprising only one physical module without a three-state buffer leads to another embodiment of a simple Ethernet diode without selector integrated in an Ethernet interface coupled to an MAC.

Figure 3:
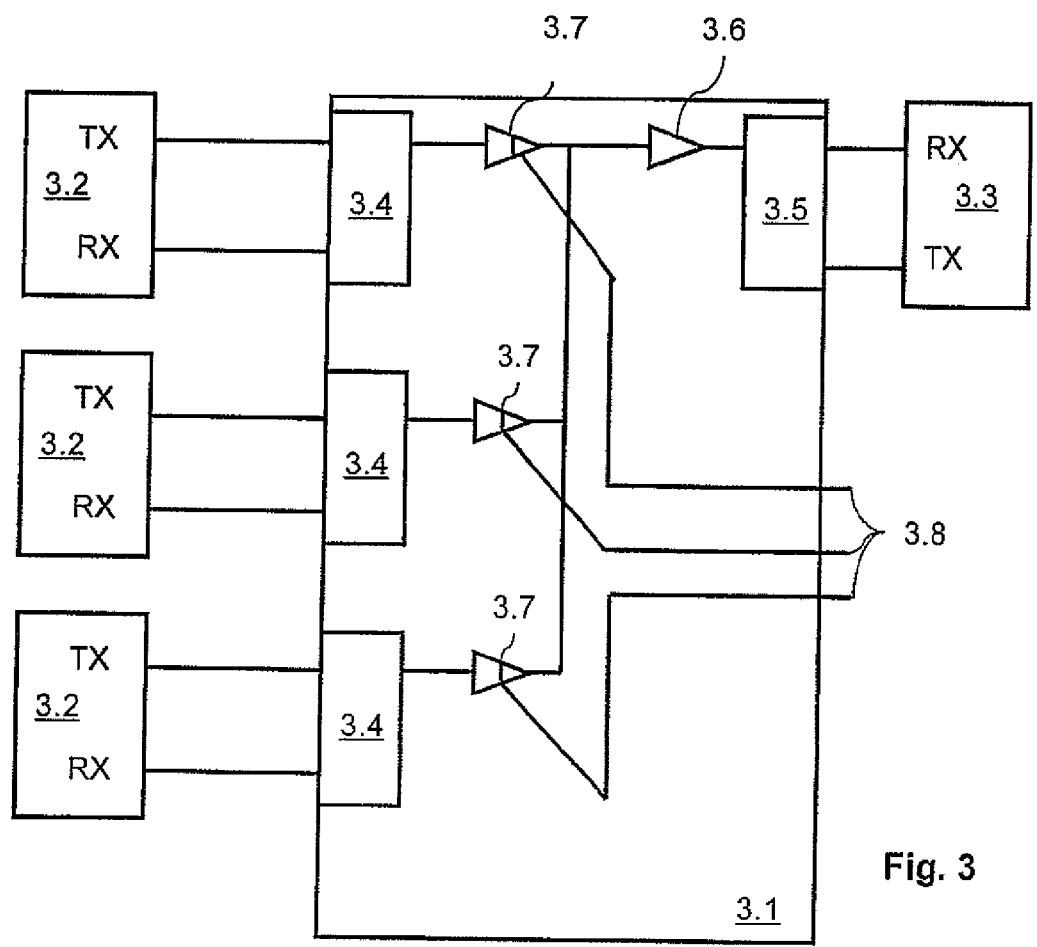
FIG. 3 presents the architecture of an embodiment of the input selector integrating an Ethernet diode.

Advantageously, the selector of FIG. 3 and that of FIG. 4 can be coupled. In this case, the interfaces on the source side 3.2 are connected by their transmission port TX to a selector like the one in FIG. 3 and by their reception port to a selector like the one in FIG. 4. In this embodiment, the internal interfaces 2.4 no longer need to generate carriers in order to activate the corresponding interface 3.2, this activation now being effected by the corresponding module 4.5. In this case, the same network interface at the target computer is used for access to the two selectors via the same Ethernet network cable, one pair of which is used for communications in one direction and the other pair for communications in the other direction, each pair communicating with a different controller 1.5 and 1.6.

Figure 5:
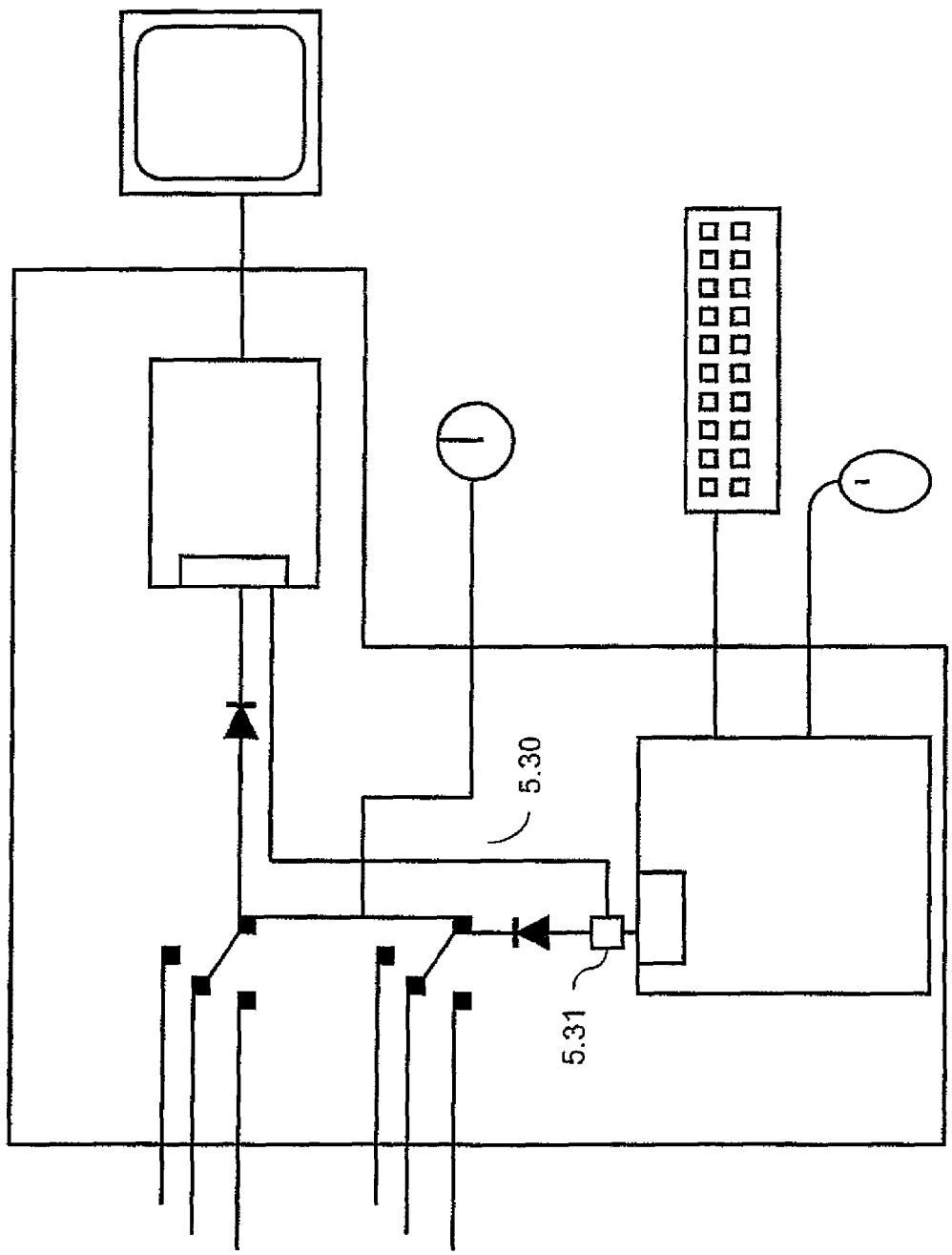

According to another embodiment of the invention, in a context where the security level demanded is less high than previously, it is possible to implement a limited return path from the output peripherals controller to the target computer. This variant no longer makes it possible to guarantee, at the physical level, that no information issuing from a target computer can go back to another target computer. However, by virtue of certain precautions, the risks that such a diversion may be effected are kept extremely low. This variant is illustrated in FIG. 5. This figure repeats FIG. 1, the target computers not being shown, and shows a link 5.30 between the controller 1.6 and the unidirectional Ethernet link connecting the input peripherals controller 1.5 and the input peripherals selector 1.18. The choice of not directly connecting the two controllers makes it possible to prevent the input peripherals controller being diverted in order to accumulate and process, or even manipulate, the information thus sent back. This information is directly injected onto the Ethernet link in the form of information injected into the Ethernet frames included in the existing stream by the injector 5.31. This direct injection of the information on the uplink already makes it possible to limit the risks of diversion of this functionality. Another constraint, also limiting this risk, can be taken, alone or in combination with the first, and consists of drastically limiting the bandwidth of this link. In practice, this link is limited to the injection of a few bits, typically 2 to 4 bytes, making it possible to construct a protocol with acknowledgement on the downlink between the target computer and the output peripheral controller. This variant therefore affords greater flexibility in the implementation of the management protocol for the output peripheral or peripherals at the cost of a slight lessening in the security guarantee for the selective connection device.

According to a particular embodiment of the invention, such a device can be used limited to a single branch. In this case, the device has only one selector allowing the connection of a peripherals controller to a target computer via a unidirectional link. This device with a single branch can make it possible to connect either solely information input peripherals or solely information output peripherals. Such a device with a single branch makes it possible to guarantee, just like the device with two branches, that information cannot pass through the controller between two target computers.

According to a particular embodiment of the invention, a third selector can be implemented at the link between the output peripherals controller and the output peripheral itself. For example, in the case where the output peripheral is a screen, a selector on the video link, whether it be of the VGA, DVI or other type, can allow the selection of a nearby target computer, directly via this video link. This supplementary target computer will therefore be connected to the input peripherals controller via the input peripherals selector 1.18 and directly to the output peripheral via this new selector, without being connected to the output peripherals selector 1.17.

The above description describes the connection of said selective connection device directly to target computers. It is also possible for this connection to be indirect and for the network connection devices, such as switches, to be inserted between the selection device and the target computer. In this case, the module managing the reception sending of the information to the peripherals 1.24 remains installed on the target computer, while the Ethernet link is connected to the network device.

The invention claimed is:

1. A selective connection device (1.1) allowing a connection of at least one peripheral (1.7, 1.8, 1.9) to a target computer (1.3) among a plurality of target computers (1.2, 1.3, 1.4), comprising:
   a. at least one controller (1.5, 1.6) to control at least one peripheral (1.7, 1.8, 1.9), said at least one controller being connected to the at least one peripheral;
   b. a selector (1.17, 1.18);
   c. a first link (1.13, 1.25) for communicating data between said at least one controller (1.5, 1.6) and the selector (1.17, 1.18);
   d. a plurality of data communication links (1.11, 1.12) between the plurality of target computers (1.2, 1.3, 1.4) and the selector (1.17, 1.18), each link in the plurality of data communication links (1.11, 1.12) being connected to a target computer in the plurality of target computers (1.2, 1.3, 1.4), the selector (1.17, 1.18) allowing a connection of the first link to any one of the links in the plurality of data communication links in order to allow communication between said at least one controller (1.5, 1.6) and any one of the target computers (1.2, 1.3, 1.4); and
   e. characterized in that the selective connection device comprises:
      means (1.20, 1.21) for making each of said plurality of data communication links (1.11, 1.12) between said selector and said any one of the target computers physically unidirectional, and wherein said means for making each of said plurality of data communications links between said selector and said any one of the target computers physically unidirectional, prevents any data exchange between the target computers using said selector.

2. The selective connection device according to claim 1, said plurality of data communication links being Ethernet links, the means for making each of said data communication links between said selector and said any one of the target computers physically unidirectional consists of a diode device (2.1) inserted on at least one of said plurality of data communication links and consisting of a first Ethernet interface (2.4) comprising a reception port and a transmission port and a second Ethernet interface (2.5) comprising a reception port and a transmission port, the reception port of the first interface being connected to the transmission port of the second interface, the reception port of the second interface being kept disconnected from the transmission port of the first interface and an integrity signal being sent over the transmission port of the first interface.

3. The selective connection device according to claim 2, wherein the diode device further comprises a plurality of first Ethernet interfaces (3.4), the reception port of each of these first Ethernet interfaces being connected to the transmission port of the second Ethernet interface via an electrically controlled means (3.7) for interrupting the integrity signal, so that only one of these reception ports of the first Ethernet interfaces is actively connected to the transmission port of the second Ethernet interface.

4. The selective connection device according to claim 2, wherein the diode device further comprises a plurality of first Ethernet interfaces, the transmission port of each of these first Ethernet interfaces being connected to the reception port of the second Ethernet interface via an electrically controlled means for interrupting the integrity signal, so that only one of these transmission ports of the first Ethernet interfaces is actively connected to the reception port of the second Ethernet interface.

5. The selective connection device according to claim 1, said plurality of data communication links being Ethernet links, the means for making each of said data communication links between said selector and said any one target computer physically unidirectional is integrated within an Ethernet interface of the said selective connection device, said Ethernet interface comprising a physical management module (4.2) of one of said Ethernet links and an MAC (media access control) management module (4.3) of said one of said Ethernet links link connected by a bus (4.4) to the physical management module of said one of said Ethernet links, said bus comprising unidirectional links, only the unidirectional links used by the said plurality of data communication links in a desired direction being connected.

6. The selective connection device according to claim 5, further comprising the Ethernet interface hosting the means for making each of said data communication links between said selector and said any one target computer physically unidirectional contains a plurality of Ethernet interfaces (4.5), each of said plurality of Ethernet interfaces generating an integrity signal, a plurality of physical management modules of the said plurality of Ethernet interfaces (4.5), and a plurality of electrically controlled means (4.4) for interrupting the integrity signal so that only one of the physical management modules (4.2) of the plurality of physical modules is actively connected to the MAC management module (4.3).

7. The selective connection device according to claim 1, further comprising a second selector wherein directions of communication of the two selectors are opposite to each other and in that the selectors are coupled.

8. The selective connection device according to claim 7, wherein the plurality of data communication links (1.11, 1.12) between a given target computer and each selector further comprise a first network link connected to a single network interface of said given target computer, connected in one direction to a first one of the said selectors and a second network link connected to a single network interface of said given target computer connected in the other direction to a second one of the said selectors.

9. The selective connection device according to claim 8, comprising a third selector at a link between said at least one controller and at least one peripheral connected to the said at least one controller, allowing direct connection of at least one target computer to the said at least one peripheral.

10. The selective connection device according to claim 1, further comprising a selective control system for a target computer among a plurality of target computers by means of a control device comprising at least one computer peripheral, said at least one computer peripheral being connected to said plurality of target computers by means of the selective connection device.

11. A selective connection device (1.1) allowing a connection of at least one peripheral (1.7, 1.8, 1.9) to a target computer (1.3) among a plurality of target computers (1.2, 1.3, 1.4), comprising:
   a. at least one controller (1.5, 1.6) to control at least one peripheral (1.7, 1.8, 1.9), said at least one controller being connected to the at least one peripheral;
   b. a selector (1.17, 1.18);
   c. a first link (1.13, 1.25) for communicating data between said at least one controller (1.5, 1.6) and the selector (1.17, 1.18);
   d. a plurality of data communication links (1.11, 1.12) between the plurality of target computers (1.2, 1.3, 1.4) and the selector (1.17, 1.18), each link in the plurality of data communication links (1.11, 1.12) being connected to a target computer in the plurality of target computers (1.2, 1.3, 1.4), the selector (1.17, 1.18) allowing a connection of the first link to any one of the links in the plurality of data communication links in order to allow communication between said at least one controller (1.5, 1.6) and any one of the target computers (1.2, 1.3, 1.4); and e. characterized in that the selective connection device comprises:
  means (1.20, 1.21) for making all communication between said at least one controller and said at least one target computer physically unidirectional and further comprising a second selector wherein directions of communication of the two selectors are opposite to each other and in that the selectors are coupled, wherein the plurality of data communication links (1.11, 1.12) between a given target computer and each selector further comprise a first network link connected to a single network interface of said given target computer, connected in one direction to a first one of the said selectors and a second network link connected to a single network interface of said given target computer connected in the other direction to second one of the said selectors, further comprising a third selector at a link between one of the said at least one controller and at least one peripheral connected to the said at least one controller, allowing direct connection of at least one target computer to the said at least one peripheral.

\* \* \* \* \*

UNITED STATES PATENT AND TRADEMARK OFFICE
CERTIFICATE OF CORRECTION

| | | |
|---|---|---|
| PATENT NO. | : 8,194,697 B2 | |
| APPLICATION NO. | : 12/036412 | |
| DATED | : June 5, 2012 | |
| INVENTOR(S) | : Guillot et al. | |

It is certified that error appears in the above-identified patent and that said Letters Patent is hereby corrected as shown below:

In the Claims:

In Column 12, at claim 5, line 10, please delete "link".

Signed and Sealed this
Fourth Day of September, 2012

David J. Kappos
*Director of the United States Patent and Trademark Office*